April 22, 1930.  G. B. BRIGHT  1,755,203

ICE PLANT

Filed May 17, 1929   3 Sheets-Sheet 1

INVENTOR.
George B. Bright
BY
George B. Ingersoll
ATTORNEY.

April 22, 1930.  G. B. BRIGHT  1,755,203
ICE PLANT
Filed May 17, 1929   3 Sheets-Sheet 3

INVENTOR.
George B. Bright
BY George B. Ingersoll
ATTORNEY.

Patented Apr. 22, 1930

1,755,203

UNITED STATES PATENT OFFICE

GEORGE B. BRIGHT, OF DETROIT, MICHIGAN

ICE PLANT

Application filed May 17, 1929. Serial No. 363,941.

My invention relates to improvements in ice plants in which freezing tanks are operated in conjunction with thawing and dumping equipment; and the objects of my improvements are, first, to provide an ice plant requiring only a single set of thawing and dumping equipment for any desired number of freezing tank units; second, to provide an ice plant capable of greater output for a given land area covered by said ice plant; third, to provide an ice plant arrangement capable of greater flexibility in its manufacturing procedure; fourth, to provide an ice plant of lower initial cost and lower operating cost; fifth, to provide an ice plant capable of being expanded from its initial size and capacity with minimum expense and investment; sixth, to provide an ice plant having a monorail utilized as a track for its harvesting equipment; seventh, to provide an ice plant having harvesting equipment operating on a movable monorail track; eighth, to provide an ice plant having means for handling ice within and without the area of its transfer way; and ninth, to provide an ice plant having harvesting means capable of selectively transferring the harvested ice from any freezing tank to a common point preparatory for sales or storage purposes.

I attain these objects by the equipment illustrated in the accompanying drawings, in which,—

Figure 1:
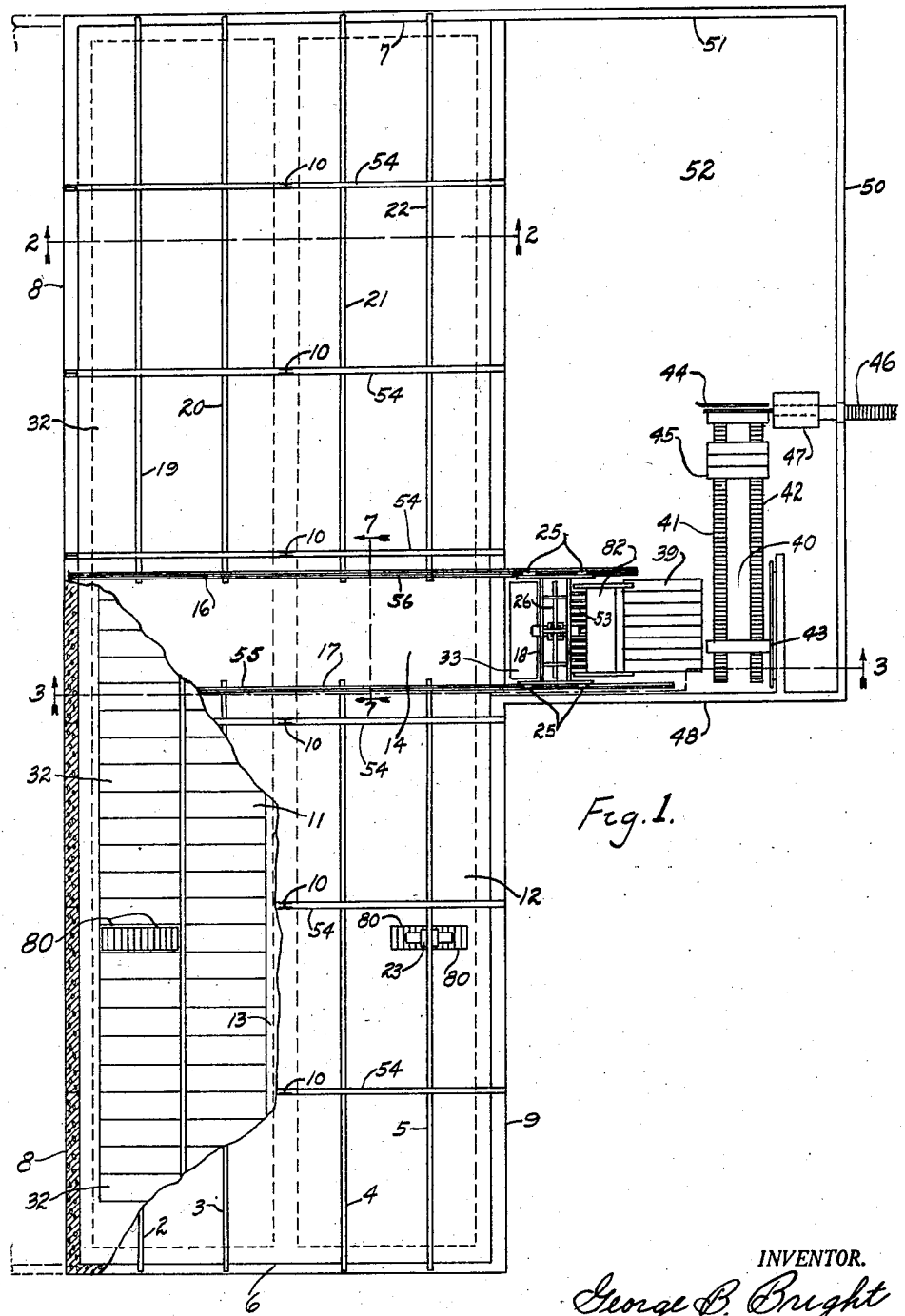
Figure 2:
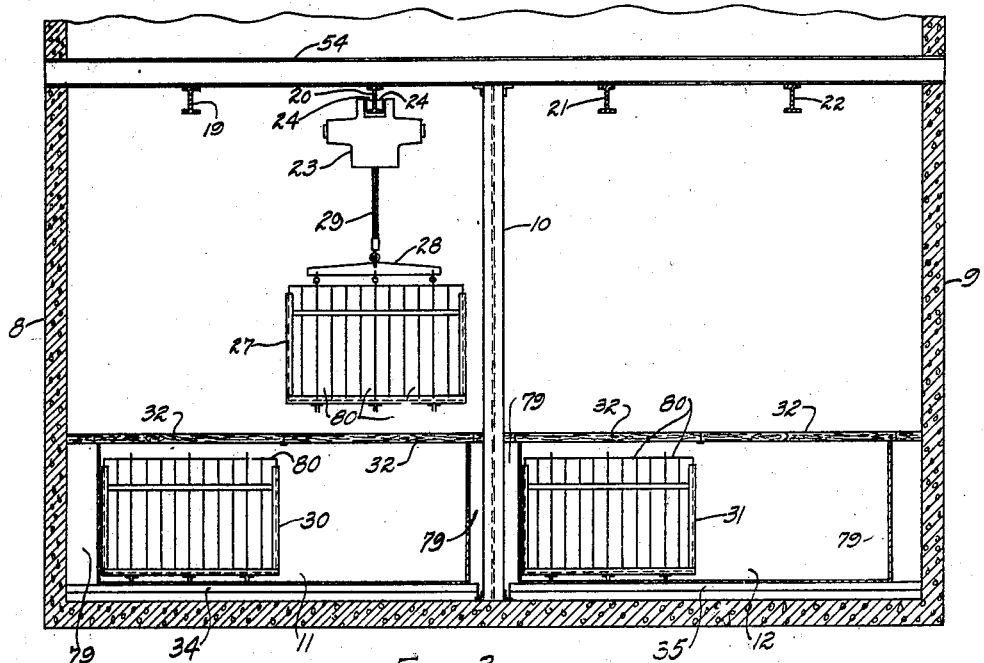
Figure 3:
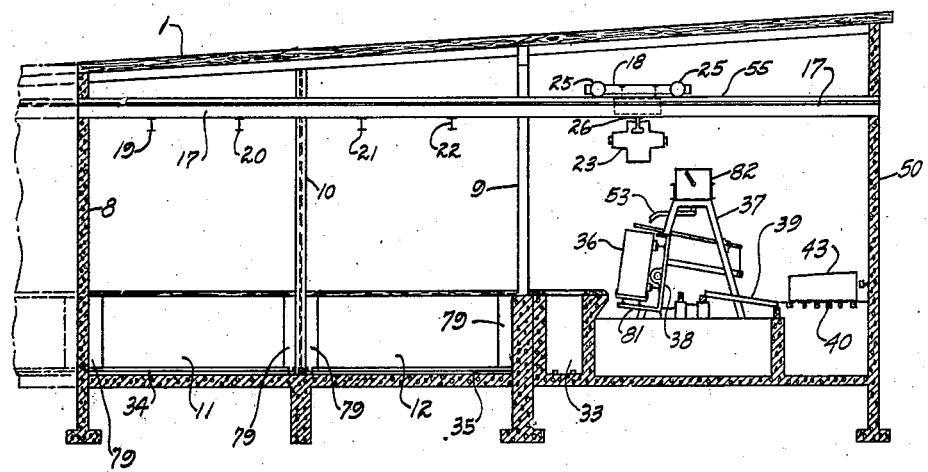
Figure 4:
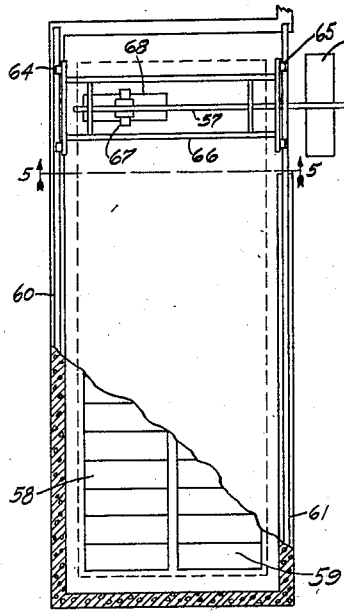
Figure 6:
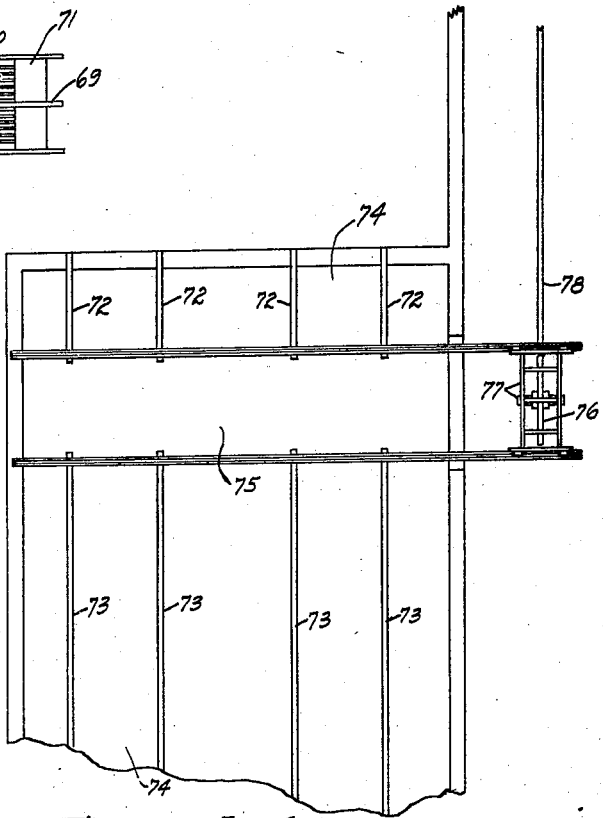
Figure 5:
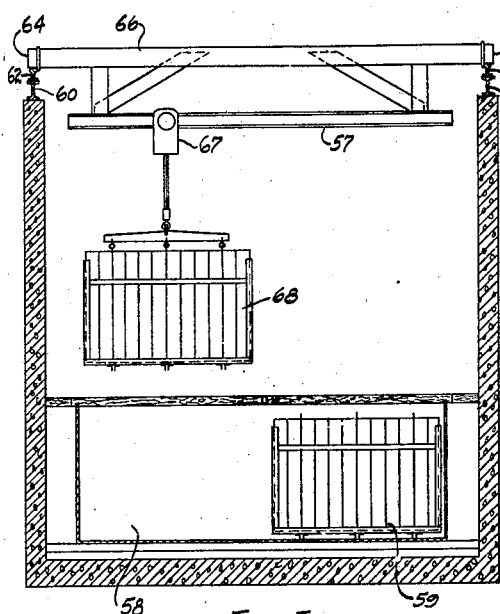
Figure 7:
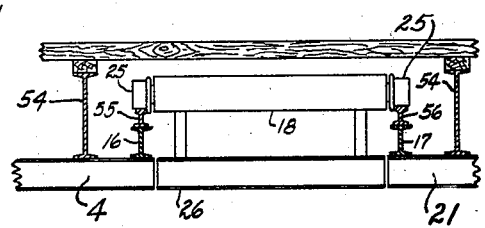

Figure 1 is a plan view of an ice plant, having monorails parallel with its freezing tanks together with a transfer way located as desired for greatest convenience; Fig. 2, an enlarged vertical section of the tank room on the line 2—2, Fig. 1; Fig. 3, an enlarged vertical section of the single set of thawing and dumping equipment on the line 3—3, Fig 1; Fig. 4, a plan view of an ice plant having a movable monorail located transversely to its freezing tanks together with transfer means located at one end of the tank room; Fig. 5, a vertical section of the tank room and movable monorail on the line 5—5, Fig. 4; Fig. 6, a plan view of an ice plant having monorails parallel with its freezing tanks together with a transfer way located near one of its ends; and Fig. 7, a sectional view on the line 7—7, Fig. 1.

Similar numerals refer to similar objects throughout the several views.

It is to be especially noted that my ice plant design incorporates a monorail which serves as a track for the wheels of a hoisting mechanism, said monorail being an I beam or any structural member incorporating a suitable monorail track support.

Figure 1 discloses a plan view of my ice plant arrangement looking down on same from a plane between the roof 1 and the monorail beams 2, 3, 4, 5, 19, 20, 21 and 22. Fig. 1 is thus shown to display the general arrangement of the various equipment units used to constitute my ice plant design. The monorail beams 2, 3, 4, 5, 19, 20, 21, and 22 are suitably supported by the end walls 6 and 7 and from above at intermediate points by the transverse structural beams 54 which are incorporated into the building construction and are further suitably supported by the side or dividing walls 8 and 9 and by the columns 10.

It is to be especially noted that in my ice plant design, the monorail beams 2, 3, 4, 5, 19, 20, 21, and 22, are arranged to extend lengthwise of the ice freezing tanks 11 and 12 which are located between the walls 8 and 9 of the building. The transverse or lateral transfer way 14 may be located as desired, and is shown in Fig. 1 at the midway point of the length of the tank room, the freezing tanks 11 and 12 completely extending under the transverse or lateral transfer way 14 between the end or load bearing walls 6 and 7. The auxiliary transfer beams 16 and 17 are customarily supported on the ends of the monorail beams 2, 3, 4, 5, 19, 20, 21, and 22, said auxiliary transfer beams 16 and 17 further supporting the transfer rails 55 and 56 which in turn support the transfer crane 18 which is equipped with wheels 25 adapted to engage with and travel on said auxiliary transfer rails 55 and 56. The auxiliary transfer beams 16 and 17 are arranged in connection with the monorail beams 2, 3, 4, and 5 together with the monorail beams 19, 20, 21, and 22 in such manner as to freely allow the hoist 23, which is equipped with wheels 24 adapted to engage with and travel upon the lower flange of the monorail beams 2, 3, 4, 5, 19, 20, 21, and 22, to further engage with and travel upon the lower flange of the movable section of monorail beam 26 of the transfer crane 18. The transfer crane 18 may be operated to and fro on its transfer rails 55 and 56 to a position where the movable section of the monorail beam 26 will be in selective alignment with either pair of the monorail beams 2 and 19, 3 and 20, 4 and 21, or 5 and 22, thus readily allowing the hoist 23 to be transferred, together with its load, from any line of freezing tanks in the tank room to the transverse or lateral transfer way and thus to any part of the building or to other buildings.

The hoist 23 is commonly provided with motor driven travel devices as well as with hoisting and lowering mechanism, one or more of said hoists being commonly provided for each freezing tank 11 or 12.

The hoisting and lowering mechanism of the hoist 23 is connected to the ice basket or multiple group of cans 27 by means of the member 28 and suspension means 29. The ice basket or multiple group of cans 27 filled with the water for freezing into ice, are lowered into the tanks 11 or 12 which are filled with the proper brine mixture for accomplishing the freezing of the water.

The ice baskets or multiple group of cans 30 and 31 are disclosed, in Fig. 2, as resting respectively on the floors 34 and 35 of the tanks 11 and 12. After the baskets or multiple group of cans 30 and 31 have remained in the tanks 11 and 12 for the required length of time, the water having been frozen into ice in the baskets or multiple group of cans, the cover 32 is removed from over the basket or multiple group of cans, and by operating the hoist 23, the ice basket or multiple group of cans is elevated to the position as shown at 27. From its position, as indicated at 27, the ice basket or multiple group of cans may be moved over the tanks by the hoist 23 on the monorails to the transfer way 14 and thence transversely, by means of the transfer crane 18, to a position over the thawing tank 33 which may be located in a position adjacent and very close to the tanks 11 or 12. The thawing tank 33 is made of sufficient size to allow the basket or multiple group of cans 27 to be lowered by means of the hoist 23, into said thawing tank 33. The thawing tank 33 is partially filled with water or proper liquid mixture which is of higher temperature than the ice in the basket or multiple group of cans 27, thus melting the ice slightly from its frozen contact with the individual cans 80. From the thawing tank 33, the basket or multiple group of cans 27 may be lifted, by the hoist 23, and deposited on the inclined platform 81 of the dumping and filling machine 82. The basket or multiple group of cans so deposited on the platform 81 is designated at 36. The dumping and filling equipment 82 is supported on the framework 37 and is equipped with suitable mechanism to cause the basket or multiple group of cans supporting mechanism 38 to oscillate sufficiently to incline the basket or multiple group of cans 36 in such manner and to such an extent as will cause the cakes of ice, which have been thawed loose from the individual ice cans 80, to be dumped on the inclined platform 39 from which the cakes will slide on to the drain supports 40 or, as desired, directly into the storage room or into a suitable room where the harvested ice may be scored and further prepared for disposal in retail trade distribution. The drain supports 40 may be used in conjunction with the conveyors 41 and 42, which operate therebetween and pick up the cakes of ice, as indicated at 43, and carry them to the stop block 44 as indicated by lines at 45, the cake next to the stop block 44 being again picked up and carried by the conveyor 46 in a direction at right angles to the direction of travel of the cakes 45 on the conveyors 41 and 42. The conveyor 46 will thus pick up the cake of ice 45 which is lying against the stop block 44, and carry said cake of ice 45 out of the line of travel of the cakes of ice on the conveyors 41 and 42 to the ice storage or through the scoring machine 47, the cake of ice 45 always being replaced by the next cake of ice on the conveyors 41 and 42 being carried against the stop block 44. The scoring machine 47 is provided with suitable machinery for scoring the cakes of ice in the proper sizes to enable the cakes of ice to be readily split into smaller cakes of the desired number of pounds for commercial use. As the cakes of ice pass through the scoring machine 47, they are carried away on the conveyor 46 to the storage room which may be located at any convenient point in or adjacent the freezing tank rooms.

The use of the conveyors 41 and 42, scoring machine 47, and conveyor 46 will result in a considerable saving in time and handling expense where plant design and land area permit the installation thereof.

The room or department enclosing the thawing tank 33, the dumping and filling machine 82, the scoring machine 47, together with the conveyors, may have its walls 48, 50, and 51 extended to provide room for the machine room 52, if desired, the machinery therein not being shown.

It is to be noted that the ice basket or multiple group of cans 36, after being emptied of the cakes of ice, by the dumping machine 82, will again be returned to its position as shown on the platform 81 where it is refilled with fresh water by means of the water conduits 53 which are suitably provided with shut off mechanism and are also suitably connected to the water supply system. The ice basket or multiple group of cans 36 can now be picked up by the hoist 23 and conveyed back for replacement in its proper place in the tanks for freezing.

In the usual or ordinary plants used for the commercial manufacture of ice, where a plurality of freezing tanks 11 and 12 are employed, it is customary to so arrange the freezing tanks between the rows of columns or bays of the building construction that sufficient space is left at one of the ends of each of the tanks 11 and 12 to permit the installation of the thawing and dumping equipment. Also the conventional type of overhead travelling crane has been universally employed, in these arrangements, with crane trackage running parallel with the freezing tanks 11 and 12, said crane trackage being supported from the building columns or wall construction. This type or design of arrangement or layout of the ice plant has limited the location and space for thawing and dumping equipment at either of the ends of the freezing tank units 11 and 12. It has also further restricted the arrangement or layout of the ice freezing room to the ice storage room at either end, or the necessity of a great waste of space along the entire end of the series of ice freezing tanks to allow for an elaborate and complicated transverse conveyor system for carrying the ice into the ice storage room when said ice storage room has been located or arranged at the side of the group of freezing tanks.

This restriction of arrangement and layout has made it extremely difficult, in many ice plants as used in the past, to coordinate the various units of the ice plant for the most satisfactory routing of the product from the the freezing of the water to the disposal of the ice cakes, and has restricted the design of such plants because of the peculiar and non-uniform shapes of many building sites sought to be made available for such purposes. Further, it has wasted and rendered non-productive considerable ground area due to the space required at the end of all ice freezing tanks for the satisfactory placement of ice thawing and dumping equipment. Also it has been an essential of the design and layout of ice freezing plants, in the past, that the ice storage room must, of necessity, adjoin the ice tank room on one of its sides and in the vast majority of cases has been limited to location at one end of the group of ice freezing tanks.

To overcome and eliminate the difficulties incidental to the design and layout of ice manufacturing plants heretofore, as above stated, in the lack of flexibility permissible for such plants located on building sites of various shapes and sizes, my invention has been developed.

In my ice plant design, the overhead monorail conveyor system has been specially adapted in a unique and novel application to the ice manufacturing industry. The monorail conveyor system, as may be used in my ice plant design consists of the parallel monorail beams 2, 3, 4, 5, 19, 20, 21, and 22, which are also parallel with the tanks 11 and 12, together with the auxiliary transfer beams 16 and 17 and the transfer rails 55 and 56 which extend transversely to said parallel monorail beams, said auxiliary transfer rails 55 and 56 permitting the transfer crane 18 to travel thereon.

It is to be noted and understood that, if desired, the parallel monorail beams 2, 3, 4, 5, 19, 20, 21, and 22 may be suitably curved together in the lateral transfer way 14 and, with suitable switches, utilized for transverse transfer purposes in place of the auxiliary transfer rails 55 and 56 and their rolling equipment. Also suspended monorail turn table devices may be employed, if desired to accomplish the transfer of the ice basket or can carrying mechanism from said parallel monorail beams to the auxiliary transverse transfer mechanism in the lateral transfer way 14.

Such transfer devices in my ice plant design are arranged and used for carrying all of the manufactured ice which is to be harvested to one central thawing, filling, and dumping location in ice plants of any desired size. If desired, one or more central thawing, filling, and dumping locations may be used in ice plants of larger size and installation without departing from the scope of my invention. However, it will be ordinarily found, in good practice, that but one set of thawing, filling, and dumping equipment will be used regardless of the number or arrangement of ice freezing tank units, and in this way, a real and substantial economy will be accomplished in the cost of the individual ice thawing, filling, and dumping equipment itself, together with a marked saving in the area of land and buildings necessarily required for the equipment of the ice plant.

In the cycle of harvesting the ice and returning the water to the tanks 11 and 12 to be frozen, it is possible to travel any distance away from the ice freezing tank room to best and most conveniently place the manufactured ice for handling into the room available for ice storage purposes.

Suitable additional elevating machinery may be utilized and arranged in conjunction with the mono-rail beams, at necessary levels for permitting the hoists 23 to travel on or off, for lowering or elevating the manufactured ice in desired handling units to ice storage rooms above or below the level of the tank room.

Greater flexibility for the conveying of the manufactured ice in its transverse or lateral travel is possible together with ability to convey the manufactured ice in directions angularly disposed to the tank room where necessary to allow for special angular wall arrangement in connection with access to the freezing tanks 11 and 12, thus making the use of my invention especially valuable in ice plants to be constructed on building plats of unusual size or shape.

The thawing and dumping equipment may be suitably arranged to allow the manufactured ice to be placed on a short and simple conveyor, as indicated at 42, as would permit the distribution and delivery of the manufactured ice in any direction and directly into the ice storage room as desired, the ice units being optionally caused to travel through the ice scoring machine 47 while en route to said storage room. Where other hoists 23 are used throughout other parts of an ice plant, it would be possible in my plant, to return any one of said hoists to any one of the freezing tank units independent of its former use or location, thus allowing an instant available replacement hoist unit in the event of trouble and completely avoids the necessity of shutting down a freezing tank unit due to defective hoisting apparatus, as is a common occurrence during mid-summer, in ice plants of prevalent design employing individual travelling cranes.

By my invention, the entire ice tank room floor space may be utilized with useful ice freezing equipment, allowing only the customary insulation space 79 between the walls of the freezing tanks 11 and 12 and the walls of the building.

The simplicity of the distributing system possible in my design of ice plant makes for a marked reduction in the initial cost thereof and in the cost of the space required for its installation together with a great reduction in the cost of the upkeep due to the minimum lengths of distributing mechanism required, the necessary power to operate same, the reduction in the operating strains therein, and a reduction in the replacement of its component parts due to corrosion. This greater simplicity of the harvesting and distributive system is due to the lesser floor space required in my ice plant design than in the ordinary plant systems as used in the ice manufacturing industry.

It is to be understood that the ice basket 27 is composed of a plurality of ice freezing cans 80, grouped in the frame device of the ice basket 27, said frame device including the member 28 which is attached, by means of the chains or cables 29, to the load block of the hoist 23.

It is also to be noted that, in my ice plant, additions in the future to present or contemplated plants entails a minimum of detail—often but the extension of the existing overhead rail system or an additional hoist.

Also labor is reduced to a minimum as sufficient electrical hoists 23 may be employed to allow one basket or group of cans to drip and temper, as at 27, while the operator is handling a second basket or group of cans 36 in and out of the dumping and filling processes.

Fig. 4, displays a layout of my ice plant design, in which it is desired to use a movable monorail 57 extending transversely to the tanks 58 and 59. Structural beams 60 and 61 are used to support the transfer rails 62 and 63 on which operate the wheels 64 and 65 of the transfer crane 66 from which is suitably suspended the monorail 57. The hoist 67 together with its mechanism for attaching to the basket or multiple group of cans 68 is adapted to travel on and be supported from the monorail 57 as stated above in reference to Figs. 1, 2, and 3. The arrangement, as displayed in Fig. 4, permits the transfer crane 66 to be moved into alignment with the fixed monorail 69 located over the thawing tank 70 and the dumping equipment 71, thus allowing the entire area covered by the tank room to be utilized for freezing. Fig. 6 displays a layout of my ice plant design, in which it is desired to use monorails 72 and 73, extending parallel with the tanks 74, said layout incorporating the transfer way 75, which in this case is located nearer the ends of the tanks 74 than the transfer way 14 in Fig. 1. Also the monorail 76 may be moved into alignment, by means of the transfer crane 77, with the fixed monorail 78 thus permitting of the transfer of the harvested ice to a distributive line parallel or at any desired angle to the tanks 74.

The various layouts of my ice plant design thus display the extreme flexibility and ease of installation to suit any required area or shape of available land or buildings, sought to be used for ice manufacturing purposes.

I claim:

1. In an ice plant, the combination of a freezing room comprising an area devoted solely to one or more ice freezing tanks with their insulated space together with one or more freezing units contained therewithin, said freezing room being provided with wall supporting structures, one or more continuous monorails above said one or more freezing units, said one or more continuous monorails being supported from the wall supporting structures of said freezing room; and means for moving a portion of each continuous monorail out of alignment with its remaining portion or portions to and beyond the limits of said freezing room through a common egress way from above the projected area of said freezing room, the traversed path of the portion of each continuous monorail moving out of alignment with its remaining portion or portions across one of the sides of the projected area of said freezing room, having a width relatively less than the length of the traversed side of the projected area of said freezing room, and means for hoisting said freezing units, said last mentioned means being adapted to travel on each of said continuous monorails.

2. In an ice plant, the combination of a freezing room comprising an area devoted solely to one or more freezing tanks with their insulated space together with one or more freezing units contained therewithin, said freezing room being provided with wall supporting structures, one or more fixed members above the one or more freezing units in said freezing room, said fixed members being supported from the wall supporting structures of said freezing room, means for hoisting the frezing units in said freezing room, said means being adapted to travel on said one or more fixed members, and means for causing said first mentioned means to travel solely over the projected area of said freezing room to a common egress way from above the projected area of said freezing room, the width of the common egress way being less than the length of the side of the projected area of said freezing room traversed by the egress way.

3. In an ice plant, the combination of a freezing room comprising an area devoted solely to one or more ice freezing tanks with their insulated space together with a plurality of freezing units contained therewithin, said freezing room being provided with wall structures, and means for conveying said freezing units to and beyond the limits of said freezing room through a common egress way from above the projected area of said freezing room, said last mentioned means having a traversed path across one of the sides of the projected area of said freezing room, at said common egress way, of lesser length than the traversed side of the projected area of said freezing room, said means being supported from the wall structures of said freezing room.

4. In an ice freezing room comprising an area devoted solely to one or more ice freezing tanks with their insulated space together with a plurality of freezing units contained therewithin, the combination of means for hoisting said freezing units and means for conveying said freezing units to and beyond the limits of the freezing room through a common egress point from above the projected area of the freezing tank or tanks with their insulated space, said last mentioned means having a traversed path across one of the sides of the projected area of the freezing tank or tanks with their insulated space, at said common egress point, of lesser width than the length of the traversed side of the projected area of the freezing tank or tanks with their insulated space.

Dated May 15, 1929, Dearborn, Mich.

GEORGE B. BRIGHT.